United States Patent
Huang et al.

(10) Patent No.: US 8,819,324 B2
(45) Date of Patent: Aug. 26, 2014

(54) COMPUTER SYSTEM WITH BRIDGE

(75) Inventors: Pai-Ching Huang, Taipei (TW);
Tsung-Fu Hung, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 287 days.

(21) Appl. No.: 12/978,391

(22) Filed: Dec. 23, 2010

(65) Prior Publication Data

US 2011/0161546 A1 Jun. 30, 2011

(30) Foreign Application Priority Data

Dec. 25, 2009 (TW) .............................. 98144982 A

(51) Int. Cl.
*G06F 13/00* (2006.01)
*G06F 13/40* (2006.01)
*G06F 13/36* (2006.01)

(52) U.S. Cl.
CPC .... *G06F 13/4027* (2013.01); *G06F 2213/0026* (2013.01)
USPC .......................................... 710/303; 710/312

(58) Field of Classification Search
USPC ................................... 710/303, 312
See application file for complete search history.

(56) References Cited

U.S. PATENT DOCUMENTS

| | | | | | |
|---|---|---|---|---|---|
| 5,991,833 | A | * | 11/1999 | Wandler et al. | 710/52 |
| 7,346,725 | B2 | * | 3/2008 | Wang et al. | 710/306 |
| 7,457,972 | B2 | * | 11/2008 | Hsiao et al. | 713/300 |
| 7,467,313 | B2 | * | 12/2008 | Han et al. | 713/320 |
| 7,554,355 | B2 | * | 6/2009 | Chang et al. | 326/38 |
| 7,750,912 | B2 | * | 7/2010 | Polzin et al. | 345/501 |
| 8,412,916 | B2 | * | 4/2013 | Sfarti et al. | 712/32 |
| 2006/0228020 | A1 | * | 10/2006 | Sakai | 382/162 |
| 2006/0248256 | A1 | * | 11/2006 | Liu et al. | 710/312 |
| 2008/0256640 | A1 | * | 10/2008 | Tobita et al. | 726/26 |
| 2009/0310942 | A1 | * | 12/2009 | Aso | 386/109 |
| 2010/0287394 | A1 | * | 11/2010 | Branover et al. | 713/323 |
| 2012/0290763 | A1 | * | 11/2012 | Li | 710/308 |

* cited by examiner

*Primary Examiner* — Paul R Myers
*Assistant Examiner* — Christopher A Daley
(74) *Attorney, Agent, or Firm* — CKC & Partners Co., Ltd.

(57) ABSTRACT

A computer system includes a central processing unit (CPU), a north bridge, a south bridge, a bridge and a slot. The north bridge is electrically connected to the CPU. The bridge is electrically connected to the north bridge and the south bridge, and the connector is connected to the bridge. The bridge generates a first data and a second data according to the data packages transmitted from the north bridge and adjusts the output bandwidth of the first data and the second data according to a channel control signal. The south bridge receives or transfers the first data via the bridge so as to communicate with the north bridge. The slot is electrically connected to the bridge and receives or transfers the second data via the bridge so as to communicate with the north bridge.

16 Claims, 9 Drawing Sheets

COMPUTER SYSTEM WITH BRIDGE

BACKGROUND OF THE INVENTION

1. Field of the Invention

The invention relates to a computer system and, more particularly, to a computer system with a bridge.

2. Description of the Related Art

At present, Intel and Advanced Micro Device (AMD) are central processing unit (CPU) manufactures having the highest market shares. Taking a computer system with the Intel CPU as an example, the south bridge and the north bridge communicate with the peripheral device via a peripheral component interconnect express (PCIe) bus, and data is transferred between the north bridge and the south bridge via a direct media interface (DMI) bus.

FIG. 1 and FIG. 2 are block diagrams showing a conventional computer system 100 and a conventional computer system 200. The computer system 100 and the computer system 200 include a main memory module 110, a CPU 120, a north bridge 130, a south bridge 140, and two slots 150 and 160, respectively. The CPU 120 is used for controlling the operations of the computer system 100 and the computer system 200, such as executing a software program, processing or calculating the data. The north bridge 130 is electrically connected to the main memory module 110 via a memory bus, it is electrically connected to the CPU 120 via a CPU bus, and it is electrically connected to the slot 150 via a PCIe bus. The slot 150 may insert a high speed expansion device (such as a graphic card), and the north bridge 130 controls the high speed communication between the main memory module 110, the CPU 120, an image sub-system, and the PCIe bus. The slot 160 may insert a low speed peripheral device (such as a hard disk control card, an universal serial bus (USB) control card, a 1394 control card, an optical disc drive (ODD), an audio card, a network card), and the peripheral device is electrically connected to the south bridge 140 via a PCIe bus. Then, the south bridge 140 processes the input and output function of the computer systems 100 and 200. On the other hand, the north bridge 130 includes a DMI output controller, and the south bridge 140 includes a DMI input controller. The data are transferred between the north bridge 130 and the south bridge 140 via four channels of the DMI bus.

In the conventional computer system 100, the slot 150 includes a group of PCIe x16 slots which may support a graphic card. After a display device (such as a screen) is connected to the graphic card, the images of the computer system 100 are outputted. In the conventional computer system 200, the slot 150 includes two PCIe x8 slots, which can support two graphic cards. With the parallel image processing method, the graphic processing per second of each graphic card can be added up, and thus the efficiency of the image processing system is improved.

However, in the present computer system, the image processing system performing advanced graphic calculations requires a higher speed, which cannot be met by the conventional computer systems 100 and 200.

BRIEF SUMMARY OF THE INVENTION

The invention provides a computer system including a central processing unit (CPU), a north bridge, a bridge, a south bridge and a slot. The north bridge is electrically connected to the CPU. The bridge is connected to the north bridge and the south bridge for adjusting the output bandwidth of the first data and the second data and generating a corresponding first data and a second data according to a channel control signal transmitted from the north bridge. The south bridge is electrically connected to the bridge to receive the first data. The slot is electrically connected to the bridge to receive the second data and exchanging the data with the north bridge via the bridge.

These and other features, aspects and advantages of the present invention will become better understood with regard to the following description, appended claims, and accompanying drawings.

DETAILED DESCRIPTION OF THE EMBODIMENTS

Figure 1:
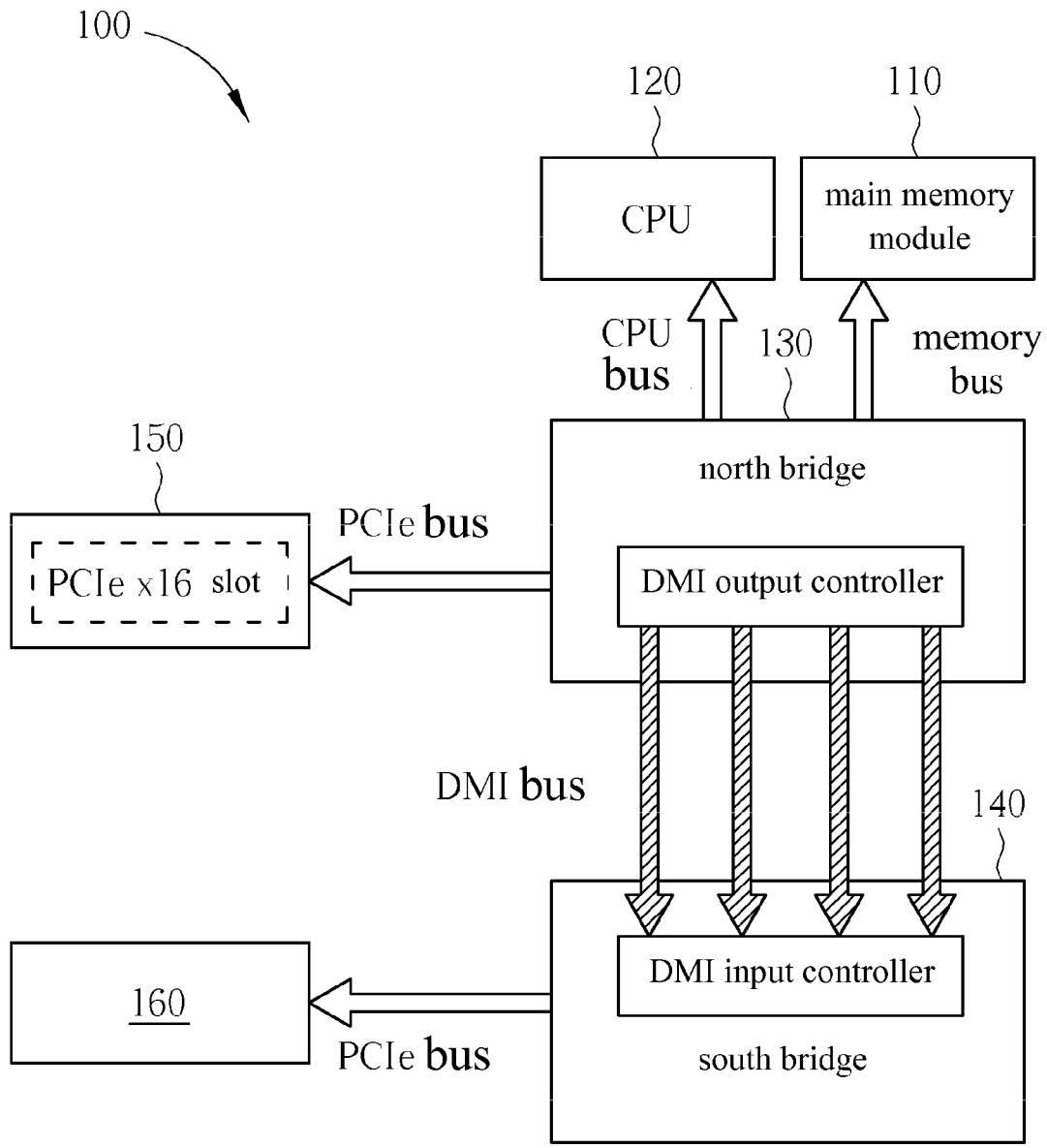
FIG. 1 is a block diagram showing a conventional computer system.
Figure 2:
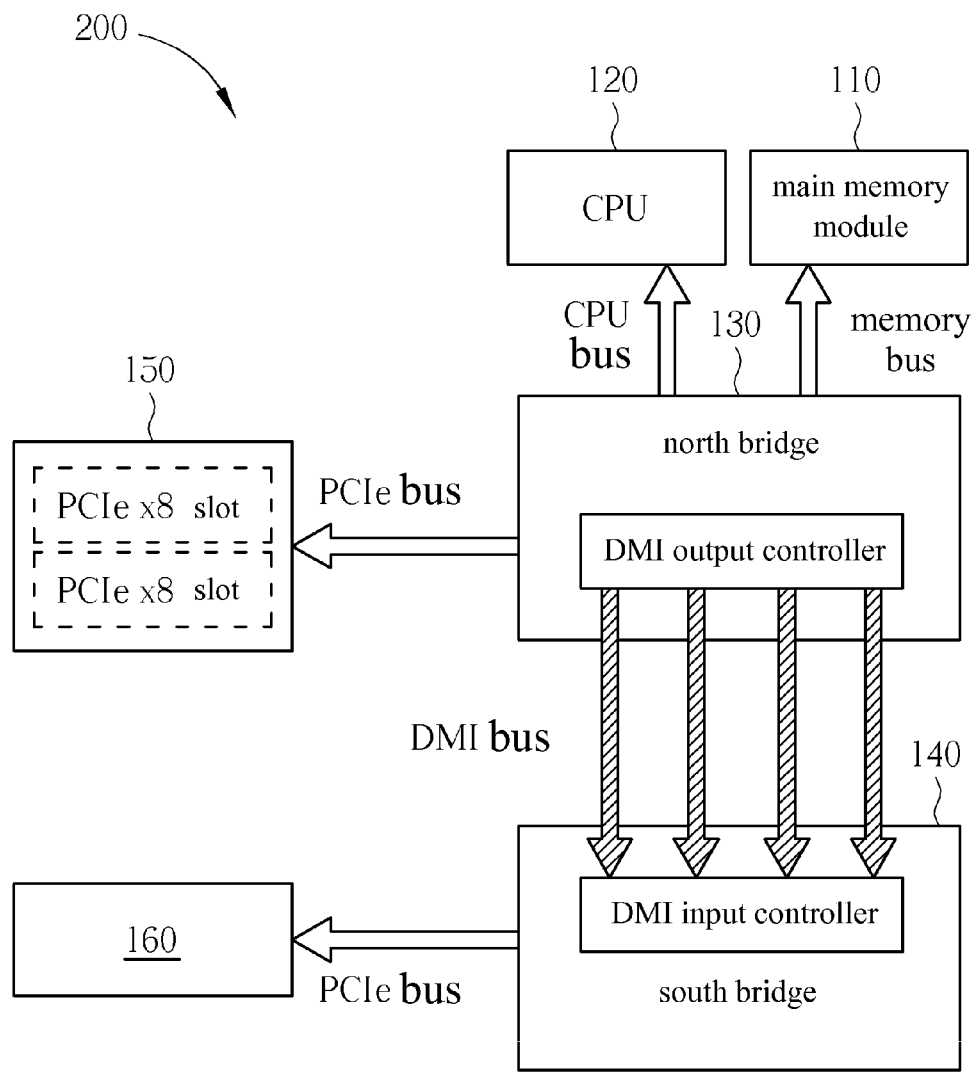
FIG. 2 is a block diagram showing another conventional computer system.

FIG. 3 to FIG. 8 are the block diagrams showing computer systems 300, 400, 500, 600, 700 and 800 in a first to a sixth embodiments of the invention. The structures of the computer systems 300, 400, 500, 600, 700 and 800 are similar, which include a main memory module 310, a central processing unit (CPU) 320, a north bridge 330, a south bridge 340, and a bridge 600. The difference is that the computer system 300 in the first embodiment and the computer system 600 in the fourth embodiment include three slots 350, 361 and 370, the computer system 400 in the second embodiment and the computer system 700 in the fifth embodiment include three slots 350, 362 and 370, and the computer system 500 in the third embodiment and the computer system 800 in the sixth embodiment include three slots 350, 363 and 370. On the other hand, in the computer systems 300 to 500 of the first embodiment to the third embodiment, the CPU 320 and the north bridge 330 are separate chips, respectively. In the computer systems 600 to 800 of the fourth embodiment to the sixth embodiment, the north bridge 330 is integrated to the CPU 320.

The CPU 320 is used for controlling the operation of the computer systems 300, 400 and 500, such as executing software program, processing or calculating the data. The north bridge 330 is electrically connected to the main memory module 310 via the memory bus, it is connected to the CPU 320 (such as the computer systems 300 to 500 in the first embodiment to the third embodiment) via a CPU bus, or it communicates directly to the CPU 320 (such as the computer systems 600 to 800 in the fourth embodiment to the sixth embodiment). The north bridge 330 is electrically connected to the slot 350 via a peripheral component interconnect express (PCIe) bus. The slot 350 may insert a high speed expansion device (such as a graphic card), and then the north bridge 330 controls high speed communication between the main memory module 310, the CPU 320, an image subsystem and the PCIe bus. The slot 370 may insert a low speed peripheral device (such as a hard disk control card, an universal serial bus (USB) control card, a 1394 control card, an optical disc drive (ODD), an audio card, a network card), and it is electrically connected to the south bridge 340 via the PCIe bus. The south bridge 340 processes the input and output function of the computer systems 300, 400 and 500. The slots 361 to 363 may insert high speed expansion devices (such as a graphic card), and it is electrically connected to the north bridge 330 via the bridge 600, so as to improve the efficiency of the image processing systems of the computer systems 300, 400 and 500 in parallel image processing method.

The north bridge 330 includes a direct media interface (DMI) output controller, and the south bridge 340 includes a DMI input controller. The bridge 600 can transfer the data to the north bridge 330 via four groups of channels (DMI bus) of a DMI bus. In the embodiment, the north bridge 330 and the bridge 600 communicate with the south bridge 340 via a DMI bus (one to three groups of channels). The north bridge 330 and the slots 361, 362 or 363 transfer data to each other via the bridge 600. The bridge 600 transforms the DMI data to the PCI data and provides the PCI data to the slot 361, 362 or 363, so as to allow the slots 361, 362 or 363 and the north bridge 330 to transfer data to each other via the bridge 600.

Figure 3:
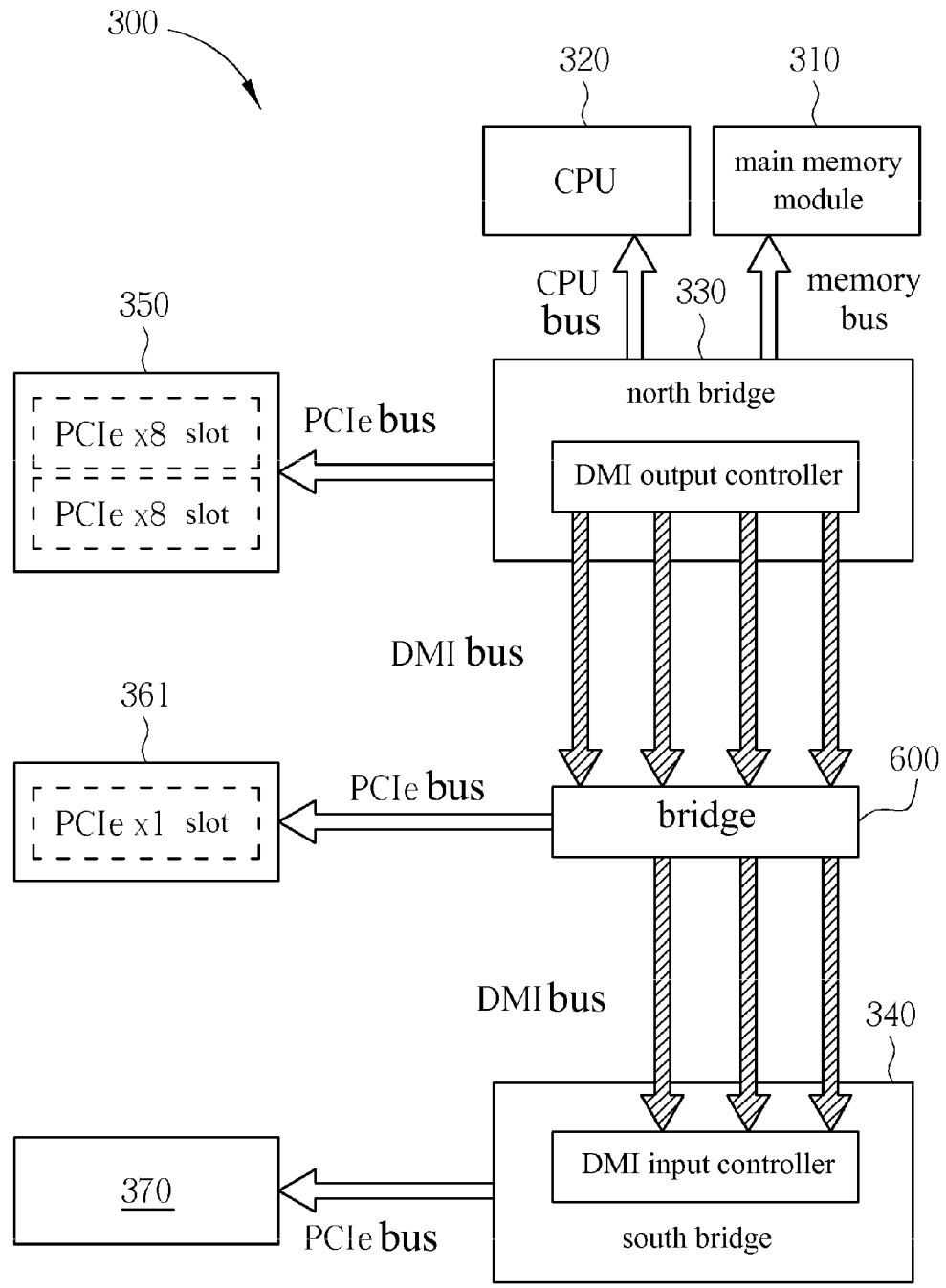
FIG. 3 is a block diagram showing a computer system in a first embodiment of the invention.
Figure 6:
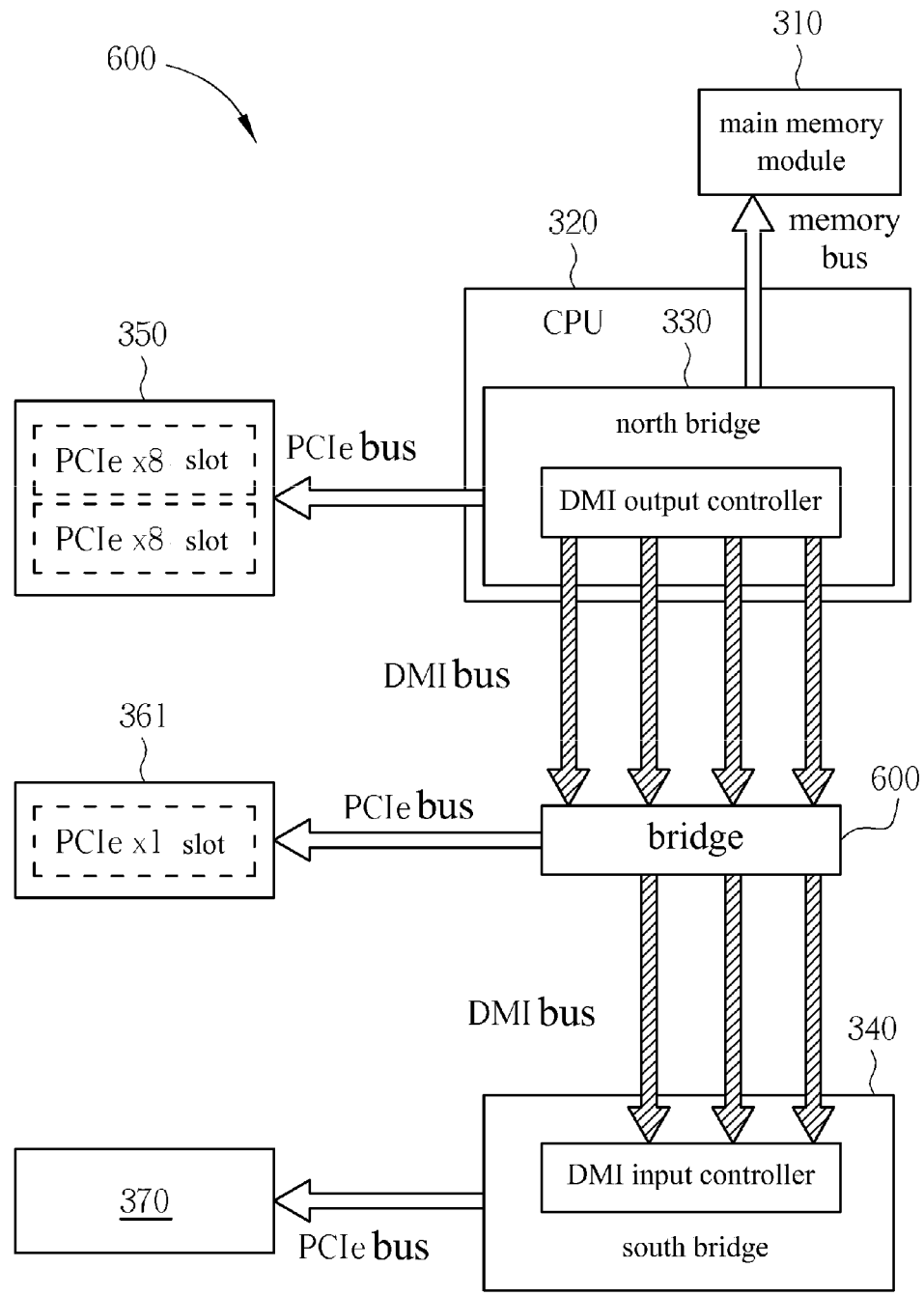
FIG. 6 is a block diagram showing a computer system in a fourth embodiment of the invention.

In the computer system 300 of the first embodiment and the computer system 600 of the fourth embodiment, after receiving the data packages transmitted from the north bridge 330, the bridge 600 decodes the data packages into the DMI data and the PCIe data and codes the DMI data and the PCIe data to generate corresponding DMI data packages. Then, the bridge 600 transfers the DMI data package to the south bridge 340 via the three groups of channels of the DMI bus, and it transfers the PCIe data package to the slot 361 via a group of channels of the PCIe bus. In FIG. 3 and FIG. 6, the slot 361 includes a group of PCIe x1 slots. Except for the graphic card originally supported by the slot 350, the slot 361 and the north bridge 330 transfers' data to each other via the bridge 600. Thus, the computer system 300 in the first embodiment of the invention can support an additional graphic card, so as to greatly improve the efficiency of the image processing system.

Figure 4:
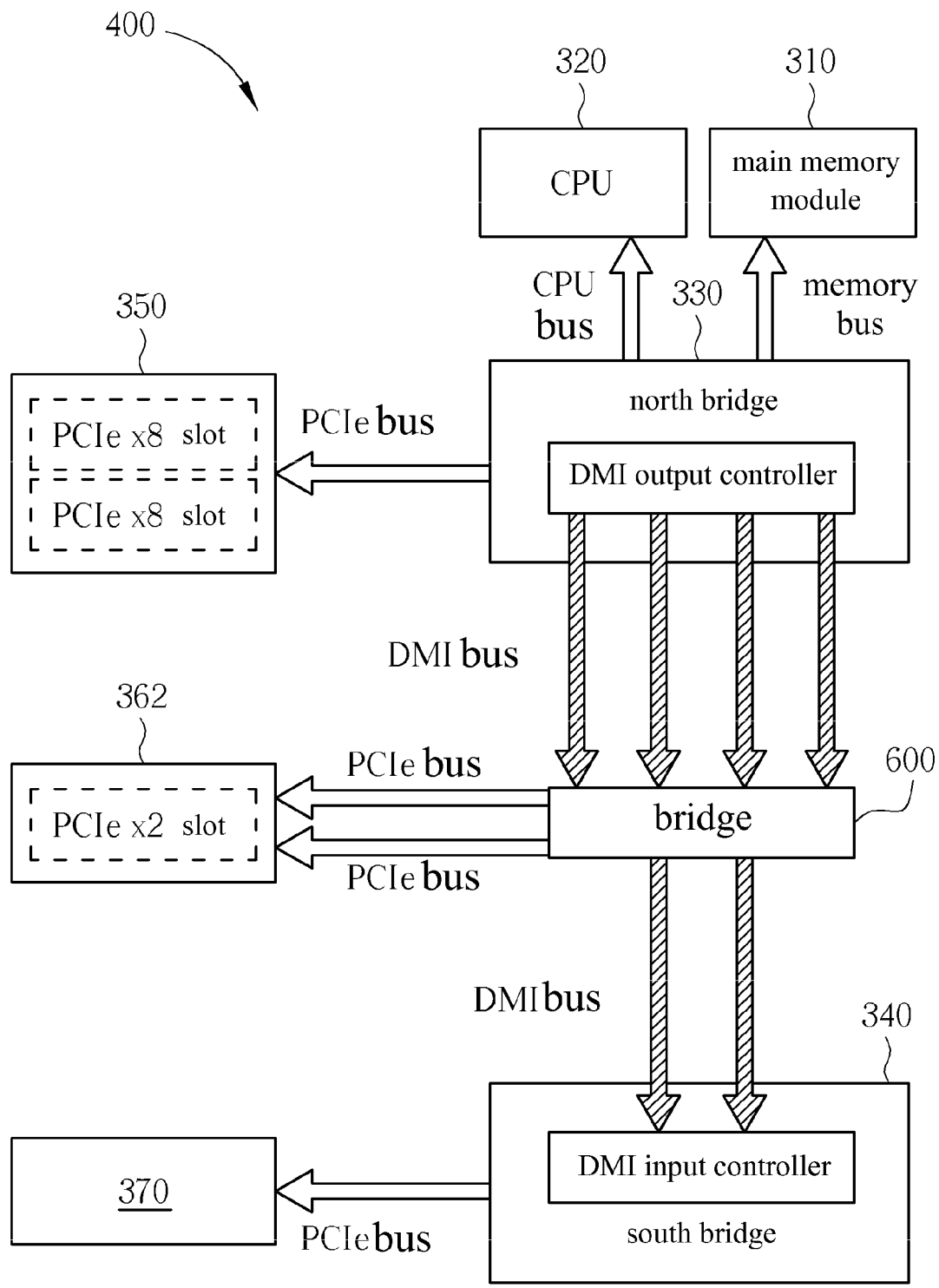
FIG. 4 is a block diagram showing a computer system in a second embodiment of the invention.
Figure 7:
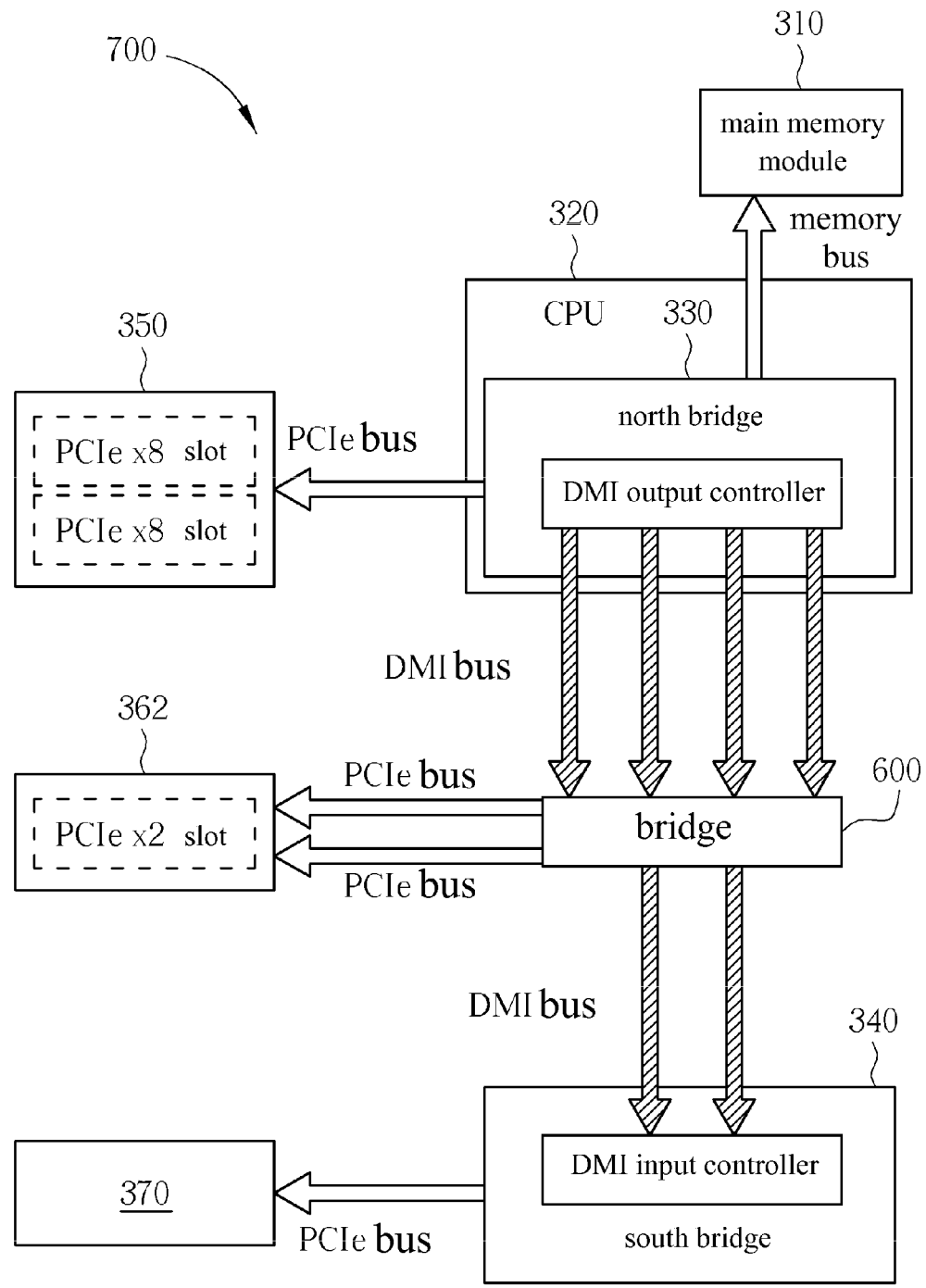
FIG. 7 is a block diagram showing a computer system in a fifth embodiment of the invention.

In the computer system 400 of the second embodiment and the computer system 700 of the fifth embodiment, after the bridge 600 receives the data packages transmitted from the north bridge 330, it decodes the data packages into the DMI data and the PCIe data, and codes the DMI data and the PCIe data to generate corresponding DMI data packages. Then, the bridge 600 transfers the DMI data package to the south bridge 340 via the two groups of channels of the DMI bus, and transfers the PCIe data package to the slot 362 via two groups of channels of the PCIe bus. In FIG. 4 and FIG. 7, the slot 362 includes a group of PCIe x2 slots. Except for the graphic card originally supported by the slot 350, the slot 362 and the north bridge 330 transfer data to each other via the bridge 600. Thus, the computer system 400 in the second embodiment of the invention can support two additional graphic cards, so as to greatly improve the efficiency of the image processing system.

Figure 5:
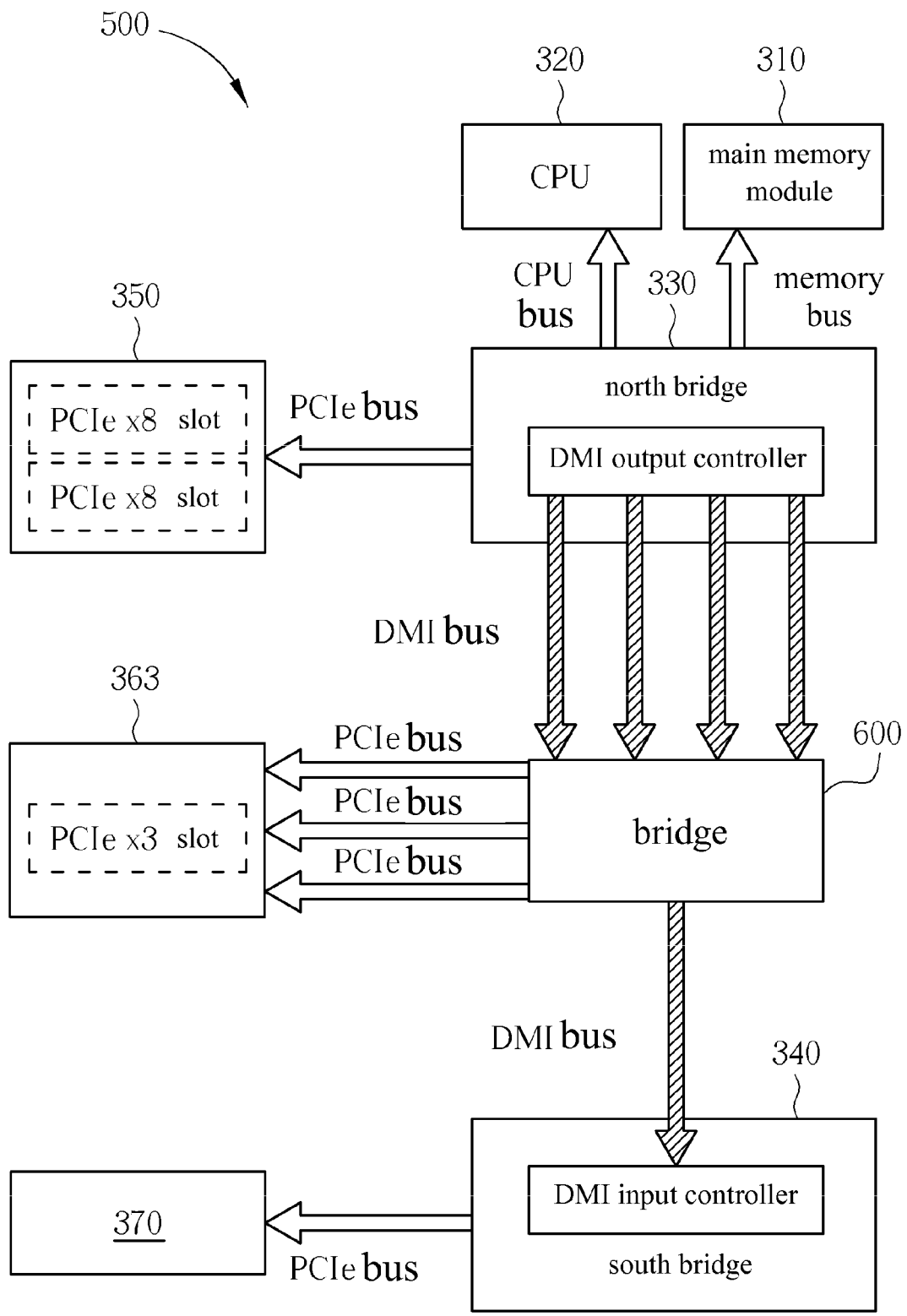
FIG. 5 is a block diagram showing a computer system in a third embodiment of the invention.
Figure 8:
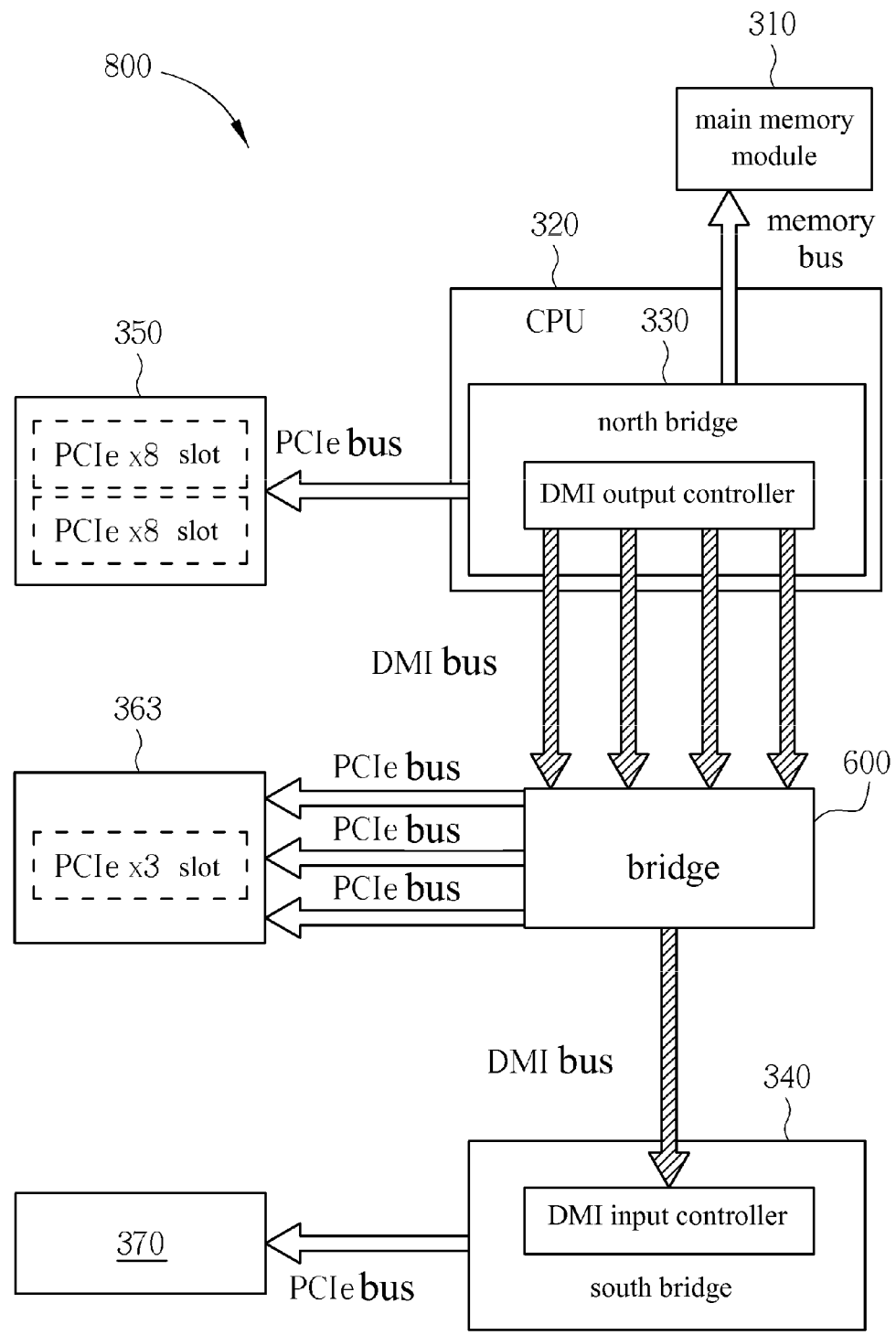
FIG. 8 is a block diagram showing a computer system in a sixth embodiment of the invention.

In the computer system 500 of the third embodiment and the computer system 800 of the sixth embodiment, after the bridge 600 receives the data packages transmitted from the north bridge 330, it decodes the data packages into the DMI data and the PCIe data, and it codes the DMI data and the PCIe data to generate corresponding DMI data packages. Then the bridge 600 transfers the DMI data packages to the south bridge 340 via a group of channels of the DMI bus and transfers the PCIe data packages to the slot 363 via three groups of channels of the PCIe bus. In FIG. 5 and FIG. 8, the slot 363 includes a group of PCIe x3 slots. Except for the graphic card originally supported by the slot 350, the slot 363 transfers the data packages to the north bridge 330 via the bridge 600. Thus, the computer system 500 in the third embodiment of the invention can support three additional graphic cards, so as to greatly improve the efficiency of the image processing system.

Figure 9:
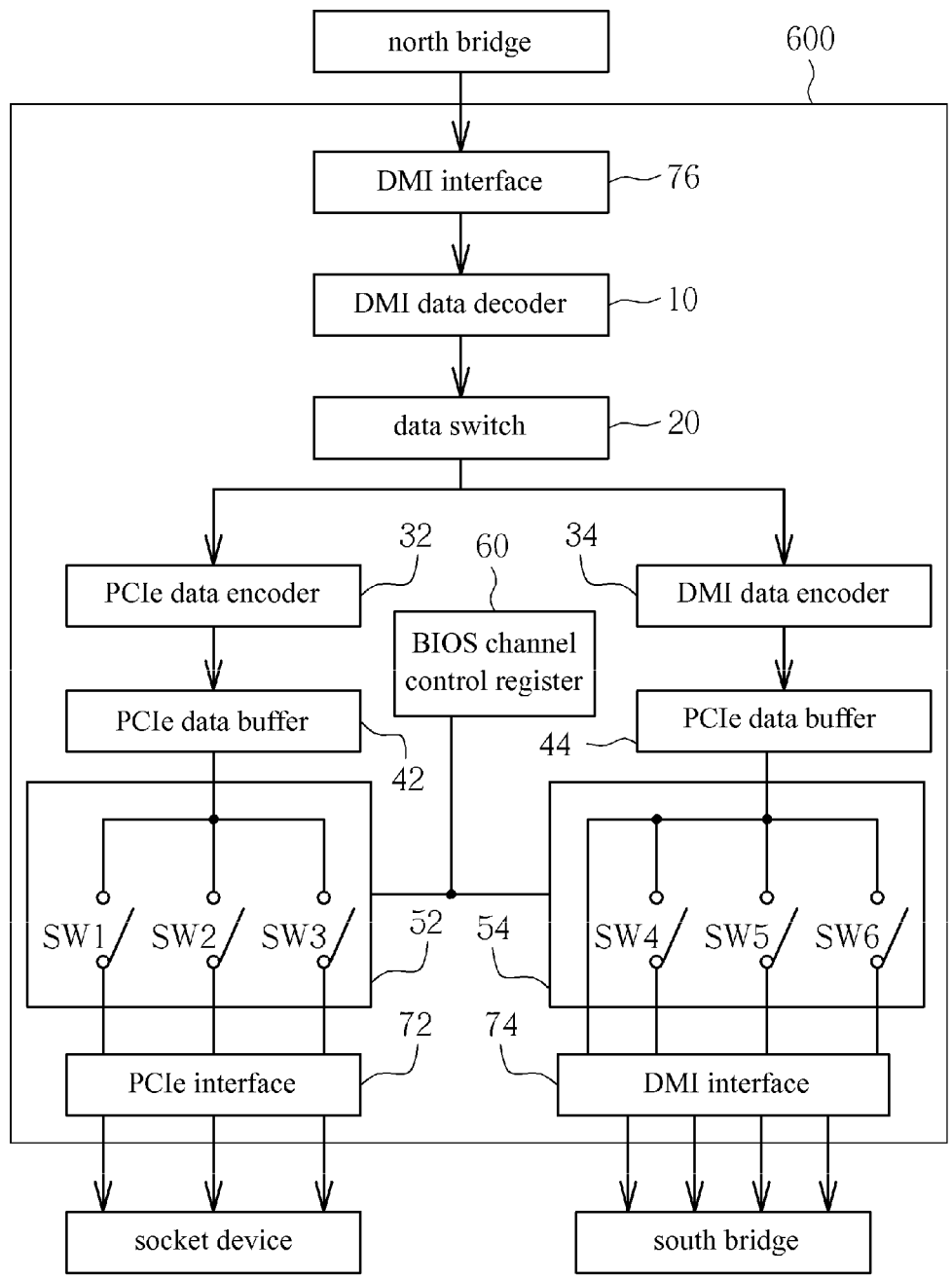
FIG. 9 is a block diagram showing a bridge in an embodiment of the invention.

FIG. 9 is a block diagram showing the bridge 600 in an embodiment of the invention. The bridge 600 includes a DMI data decoder 10, a data switch 20, a PCIe data encoder 32, a DMI data encoder 34, a PCIe data buffer 42, a DMI data buffer 44, two channel multiplexer 52 and 54, a basic input/output system (BIOS) channel control register 60, a PCIe interface 72, and two DMI interfaces 74 and 76. As shown in FIG. 3 to FIG. 8, the DMI interface 76 of the bridge 600 transfers the data to the DMI output controller of the north bridge 330 via four groups of channels of the DMI bus. After the DMI data decoder 10 receives the data packages transmitted from the north bridge 330, it decodes the data packages into the PCIe data and the DMI data, and then it transfers the PCIe data and the DMI data to the PCIe data encoder 32 and the DMI data encoder 34 via the data switch 20, respectively. After the data is encoded, the PCIe data encoder 32 and the DMI data encoder 34 transfer the PCIe data package and the DMI data package to the channel multiplexer 52 and 54, respectively. According to the channel control signal transmitted from the BIOS channel control register 60, the channel multiplexer 52 outputs zero to three pieces of PCIe data to the PCIe interface 72, and then the data is transferred to the slots 361, 362 or 363 via the zero to three groups of channels of the PCIe bus. The channel multiplexer 54 outputs one to four pieces of DMI data to the DMI interface 74, and then the data are transferred to the DMI input controller of the south bridge 340 via one to four groups of channels of the DMI bus.

In the bridge 600 of the invention, the channel multiplexer 52 includes switches SW1 to SW3, the channel multiplexer 54 includes switches SW4 to SW6, and the switches can operate according to the channel control signal transmitted from the BIOS channel control register 60. For example, in the computer system 300 of the first embodiment and the computer system 600 of the fourth embodiment, the switch SW1 of the channel multiplexer 52 is on (close circuit), and the switches SW2 and SW3 are off (open circuit), the switches SW4 and SW5 of the channel multiplexer 54 are on, and the switch SW6 is off to allow the bridge 600 to transfer the data to the south bridge 340 via the three groups of channels of the DMI bus and transfer data to the slot 361 via one group of channels of the PCIe bus. In the computer system 400 of the second embodiment and the computer system 700 of the fifth embodiment, the switches SW1 and SW2 of the channel multiplexer 52 are on, the switch SW3 is off, the switch SW4 of the channel multiplexer 54 is on, and the switches SW5 and SW6 are off to allow the bridge 600 to transfer the data to the south bridge 340 via the two groups of channels of the DMI bus and transfer data to the slot 362 via the two groups of channels of the PCIe bus. In the computer system 500 of the third embodiment and the computer system 800 of the sixth embodiment, the switches SW1 to SW3 of the channel multiplexer 52 are on, the switches SW4 to SW 6 of the channel multiplexer 54 are off to allow the bridge 600 to transfer the data to the south bridge 340 via one group of channels of the DMI bus and transfer data to the slot 363 via the three groups of channels of the PCIe bus.

In the embodiments of FIG. 3 to FIG. 8, the CPU 320 may be an Intel CPU. Thus, the north bridge 330 and the south bridge 340 communicate with the peripheral devices via the PCIe bus, and the north bridge 330 transfers the data to the south bridge 340 via the DMI bus. However, the computer system of the invention also may use a CPU of other manufacturers, and the data may be transferred via a bus with other specifications. For example, the bridge 600 in the invention may communicate with other devices via three types of buses, the first bus transfers the data via M channels at most, the second bus transfers the data via N channels at most, and the third bus transfers the data via P channels at most (M, N, P are positive integers). The bridge 600 transfers the data to the north bridge 330 via the M channels of the first bus, the bridge 600 transfers the data to the south bridge 340 via the n channels of the second bus, the bridge 600 transfers the data to the slots 361, 362 or 363 via the p channels of the third bus. N is a positive integer not larger than N, p is a positive integer not larger than P, and M is the sum of n and p. In the invention, the data transferring specification of the first to the third buses and the number of the channels may be determined according to the type of the CPU. FIG. 3 to FIG. 8 only shows the embodiments of the invention. The invention is not limited thereto.

In the invention, not only the slot 350 supports high speed expansion devices, but also the slots 361 to 363 supporting the high speed expansion device are controlled via the bridge 600. As a result, more high speed expansion devices (such as a graphic card) can be supported to improve the efficiency of the computer system (such as increasing the speed of the image processing).

Although the present invention has been described in considerable detail with reference to certain preferred embodiments thereof, the disclosure is not for limiting the scope of the invention. Persons having ordinary skill in the art may make various modifications and changes without departing from the scope. Therefore, the scope of the appended claims should not be limited to the description of the preferred embodiments described above.

What is claimed is:

1. A computer system, comprising:
   a central processing unit (CPU);
   a north bridge electrically connected to the CPU;
   a bridge connected to the north bridge and the south bridge for correspondingly generating a first data and a second data according to a data packages transmitted from the north bridge and adjusting an output bandwidth of the first data and the second data, wherein the bridge comprises:
   a data decoder for decoding the data packages transmitted from the north bridge to generate the first data and the second data;
   a first data encoder for generating a first data package corresponding to the first data; and
   a second data encoder for generating a second data package corresponding to the second data;
   a south bridge electrically connected to the bridge to receive the first data; and
   a first slot electrically connected to the bridge to receive the second data and exchanging the data with the north bridge via the bridge.

2. The computer system according to claim 1, wherein bridge further comprises:
   a first data buffer for storing the first data package; and
   a second data buffer for storing the second data package.

3. The computer system according to claim 2, wherein the bridge further comprises:
   a first channel multiplexer including:
   an input end electrically connected to the first data buffer to receive the first data package;
   a control end to receive a channel control signal; and
   a plurality of the output ends for outputting the first data package, wherein the first channel multiplexer switch the transmission paths between the input end and the output ends according to the channel control signal.

4. The computer system according to claim 2, wherein the bridge further comprises:
   a second channel multiplexer including:
   an input end electrically connected to the second data buffer to receive the second data package;
   a control end for receiving the channel control signal; and
   a plurality of the output ends for outputting the second data package, wherein the second channel multiplexer switch the transmission paths between the input end and the output ends according to the channel control signal.

5. The computer system according; to claim 1, wherein the bridge comprises a basic input/output system (BIOS) channel control register for providing a channel control signal, and the bridge adjusts the output bandwidth of the first data and the second data according to the channel control signal.

6. The computer system according to claim 1, wherein data is transferred between the north bridge and the bridge via m channels of a first bus, the data is transferred between the south bridge and the bridge via n channels of a second bus, m is a positive integer, and n is a positive integer not larger than m, 7. The computer system according to claim 6, wherein the first bus and the second bus are direct media interface (DMI) buses.

8. The computer system according to claim 7, wherein the first data conform to DMI bus transferring specification.

9. The computer system according to claim 6, wherein the first slot and the bridge transfer the data to each other via p channels of a third bus, and p is a positive integer.

10. The computer system according to claim 9, wherein the value of m is the sum of n and p.

11. The computer system according to claim 9, wherein the first slot at least comprises a group of peripheral component interconnect express (PCIe) slots.

12. The computer system according to claim 11, wherein the first bus and the second bus are DMI buses, and the third bus is a PCIe bus.

13. The computer system according to claim 12, wherein the first data conform to DMI bus transferring specification, and the second data conform to PCIe bus transferring specification.

14. The computer system according to claim 1, further comprising a second slot transferring data to the north bridge via a fourth bus.

15. The computer system according to claim 14, wherein the second slot at east comprises a group of PCIe slots.

16. The computer system according to claim 15, wherein the fourth bus is PCIe bus.

* * * * *